United States Patent [19]

Krueter

[11] Patent Number: 4,548,074
[45] Date of Patent: Oct. 22, 1985

[54] WIND SPEED AND DIRECTION INDICATOR

[76] Inventor: Kenneth G. Krueter, 1230 Centennial Dr., Thief River Falls, Minn. 56701

[21] Appl. No.: 549,909

[22] Filed: Nov. 9, 1983

[51] Int. Cl.⁴ .......................... G01F 1/05; G01W 1/02
[52] U.S. Cl. .................................... 73/189; 73/861.85
[58] Field of Search .............................. 73/189, 861.85

[56] References Cited

U.S. PATENT DOCUMENTS

| 2,375,227 | 5/1945 | Hillman | 73/189 |
| 3,282,099 | 11/1966 | Kingman | 73/189 |
| 3,420,101 | 1/1969 | Adams | 73/189 |
| 4,334,430 | 6/1982 | Hansan | 73/189 |

FOREIGN PATENT DOCUMENTS 1287569 8/1972 United Kingdom .................. 73/189

Primary Examiner—Herbert Goldstein
Attorney, Agent, or Firm—Candor, Candor & Tassone

[57] ABSTRACT

A wind direction device comprising first and second electrical coils for respectively producing electrical signals utilized for indicating the wind direction, and an anemometer for rotating a first actuator through a signal producing gap of the first coil and for rotating a second actuator through a signal producing gap of the second coil, the gap of the first coil being defined by a fixed tang and the gap of the second coil being defined by a movable tang that is positioned by a weather vane carried by the device whereby the movable tang is positioned in relation to the actual position of the weather vane.

15 Claims, 7 Drawing Figures

4,548,074

WIND SPEED AND DIRECTION INDICATOR

BACKGROUND OF THE INVENTION

1. Field of the Invention

This invention relates to an improved weather vane system for a boat or the like as well as to an improved weather vane device for such a system or the like and to a method of making the weather vane device.

2. Prior Art Statement

It is known to provide a weather vane system for a boat or the like having a weather vane device providing an electrical signal means that is utilized by an indicating means of the system for indicating the wind direction relative to a particular part of the boat or the like carrying the device, the device having a rotatable weather vane and having means operatively associated with the weather vane for producing the signal means.

The prior known weather vane device for the above system has a servomotor and a weather vane that turns a servomotor shaft, the servomotor having a single phase stator and a two-phase rotor turned by the shaft. An indicating instrument of the weather vane system provides electrical power to the stator with the generated voltages in the rotor being transmitted back to the indicator which indicates the wind angle relative to the particular part of the boat, such as the bow thereof. Such prior known weather vane device has an anemometer consisting of three half spheres rotated by the wind which, in turn, rotates a permanent magnet in the proximity of a fixed coil within the device which generates pulses proportional to the wind speed so that such pulses can be transmitted to an instrument which indicates the wind speed whereby the wind speed can also be displayed by the same instrument that indicates the wind angle.

SUMMARY OF THE INVENTION

It is one feature of this invention to provide an improved weather vane system for a boat or the like.

In particular, it was found according to the teachings of this invention that the anemometer for a weather vane device can be utilized in combination with the weather vane thereof to provide an electrical signal means that can be utilized for indicating the wind direction and in one embodiment of this invention, no electrical power need be supplied to such weather vane device of this invention as the same is completely self-powered as will be apparent hereinafter.

For example, one embodiment of this invention provides a weather vane system for a boat or the like having a weather vane device providing an electrical signal means that is utilized by an indicating means of the system for indicating the wind direction relative to a particular part of the boat or the like carrying the device, the device having a rotatable weather vane and having means operatively associated with the weather vane for producing the signal means. The means for producing the signal means comprises an anemometer that is rotatably carried by the device and is adapted to be rotated by the wind that positions the weather vane. The anemometer has a first means for providing a first electrical current signal for every revolution thereof relative to the particular part of the boat and has a second means for producing a second electrical current signal for every revolution thereof relative to the actual position of the weather vane whereby the first and second electrical current signals are utilized by the indicating means to indicate wind angle relative to the particular part of the boat by the indicating means multiplying 360° by the quotient of the time that elapses between the occurrence of a first electrical current signal and the next second electrical current signal divided by the time that elapses between the occurrence of two successive first electrical current signals whereby the first electrical current signals and the second electrical current signals comprise the electrical signal means. The device has a housing means. The anemometer has a rotatable shaft provided with a section thereof disposed in the housing means. The first means comprises a first electrical coil means disposed in the housing means and a first actuator means carried by the section of the shaft to cause the first coil means to produce the first electrical current signal for every revolution of the first actuator means relative to the particular part of the boat. The second means comprises a second electrical coil means disposed in the housing means and a second actuator means carried by the section of the shaft to cause the second coil means to produce the second electrical current signal for every revolution of the second actuator means relative to the actual position of the weather vane. The first coil means has a first air gap means. The first actuator means causes the first coil means to produce the first electrical current signal each time the first actuator means passes through the first air gap means. The second coil means has a second air gap means. The second actuator means causes the second coil means to produce the second electrical current signal each time the second actuator means passes through the second air gap means. The first coil means has a fixed tang defining one side of the first air gap means. The second coil means has a movable tang defining one side of the second air gap means. The weather vane has a rotatable shaft provided with a section thereof disposed in the housing means. The movable tang is carried by the section of the shaft of the weather vane so as to be positioned in the housing means in relation to the actual position of the weather vane.

Accordingly, it is an object of this invention to provide an improved weather vane system for a boat or the like, the system of this invention having one or more of the novel features of this invention as set forth above or hereinafter shown or described.

Another object of this invention is to provide an improved weather vane device for such a system or the like, the weather vane device of this invention having one or more of the novel features of this invention as set forth above or hereinafter shown or described.

Another object of this invention is to provide an improved method of making such a weather vane device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
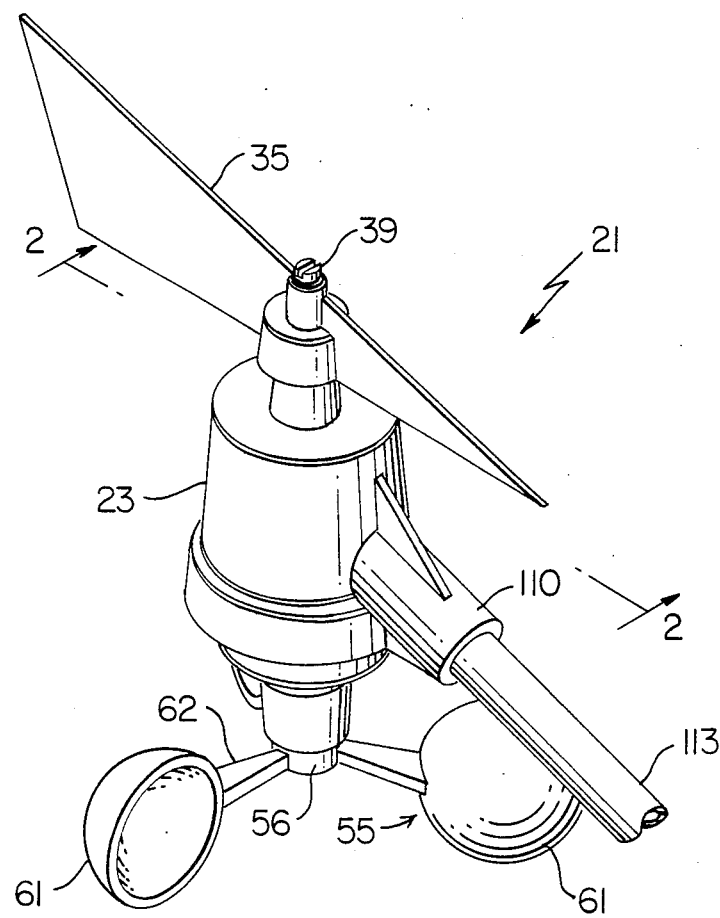
FIG. 1 is a fragmentary top perspective view of the improved weather vane device of this invention.

While the various features of this invention are hereinafter illustrated and described as particularly adapted to provide a weather vane system and device for a boat, it is to be understood that the various features of this invention can be utilized singly or in any combination thereof to provide a weather vane system and/or weather vane device for other structures, such as land vehicles, buildings, homes, etc. whereby the terms "boat or the like" is intended to cover such other structures.

Therefore, this invention is not to be limited to only the embodiment illustrated in the drawings, because the drawings are merely utilized to illustrate one of the wide variety of uses of this invention.

Figure 7:
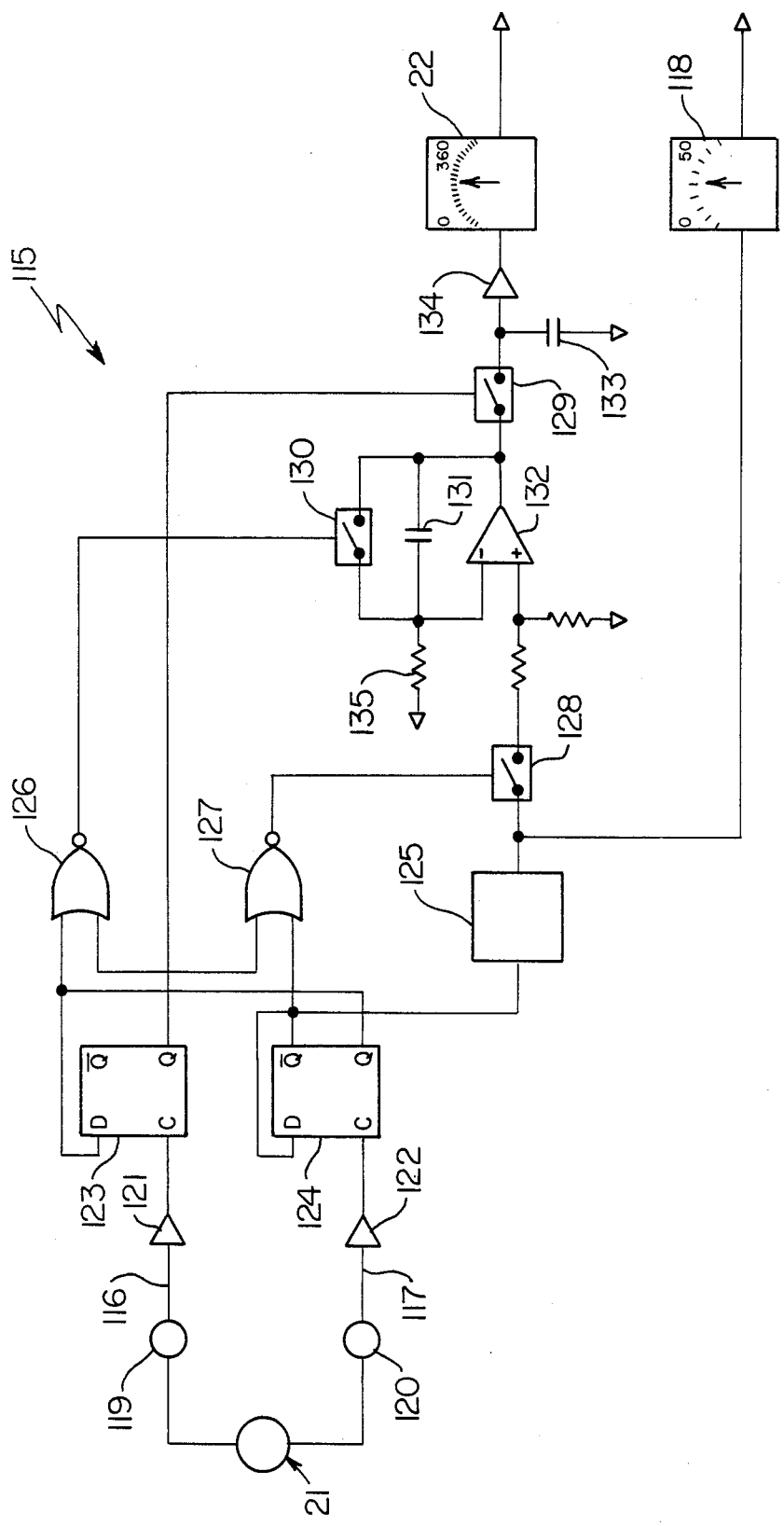
FIG. 7 is a schematic view illustrating the weather vane system of this invention utilizing the weather vane device of FIGS. 1-4.

Referring now to FIG. 7, the improved weather vane system of this invention is generally indicated by the reference numeral 20 and comprises a weather vane device of this invention that is generally indicated by the reference numeral 21 and provides an electrical signal means that is utilized by an indicating means 22 in the manner hereinafter set forth for indicating the wind direction relative to a particular part of a boat or the like carrying the device 21, such as the wind direction relative to the bow of a boat so that the operator of the boat can readily utilize such information in a manner well known in the art for operating the boat in a desired manner.

As illustrated in FIGS. 1-5, the weather vane device 21 comprises a housing means 23 formed of two cup-shaped parts 24 and 25 respectively having their open ends 26 and 27 secured together in telescoped relation and thereby defining a chamber 28 therebetween, the cup-shaped members 24 and 25 respectively having closed ends 29 and 30 respectively defining tubular portions 31 and 32 and internal shoulder means 33 and 34. The cup-shaped parts 24 and 25 can be formed of any suitable non-electrical conductive material, such as plastic material and can be molded into the configuration illustrated in the drawings.

Figure 2:
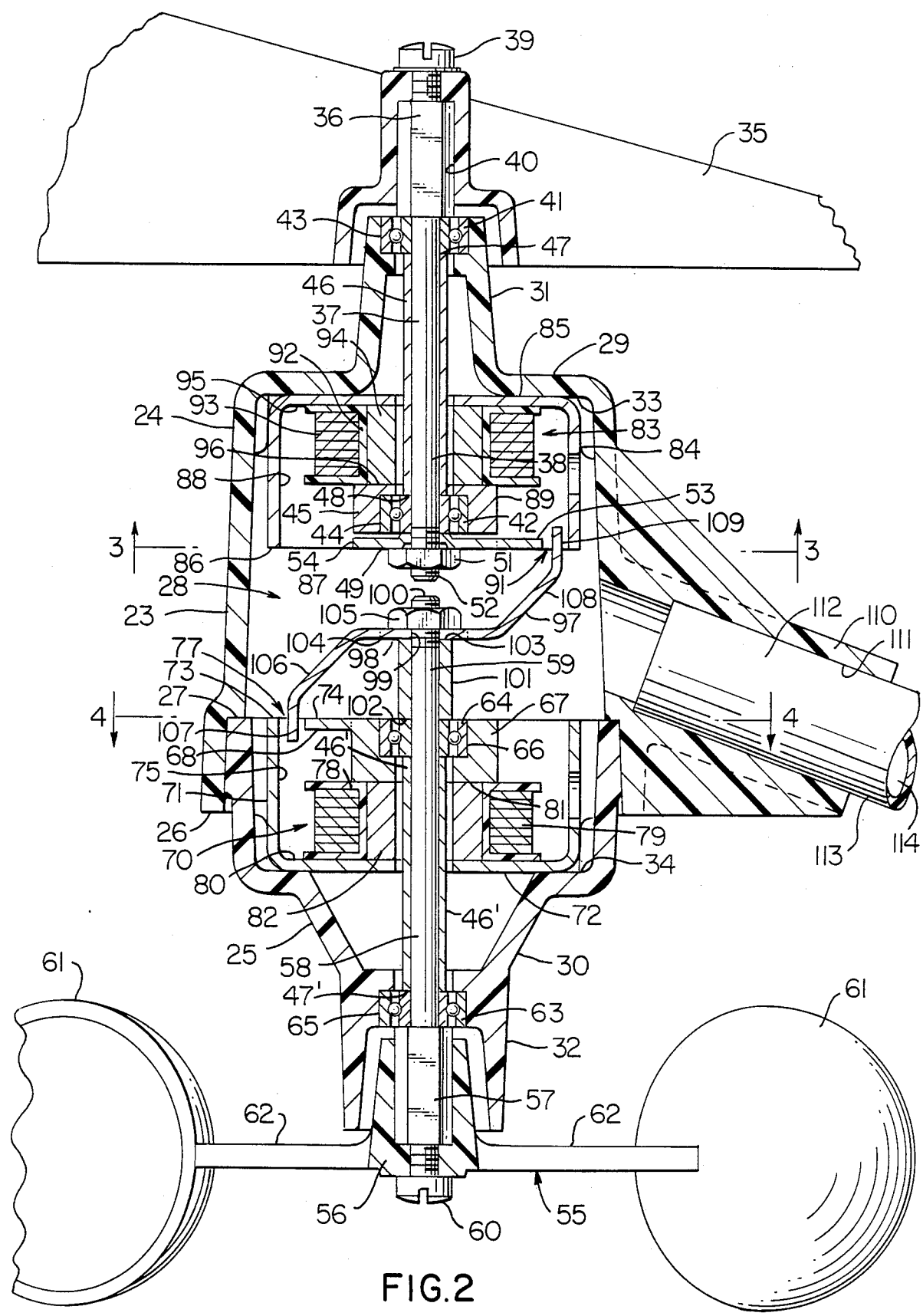
FIG. 2 is an enlarged, fragmentary, cross-sectional view taken on line 2—2 of FIG. 1.
Figure 3:
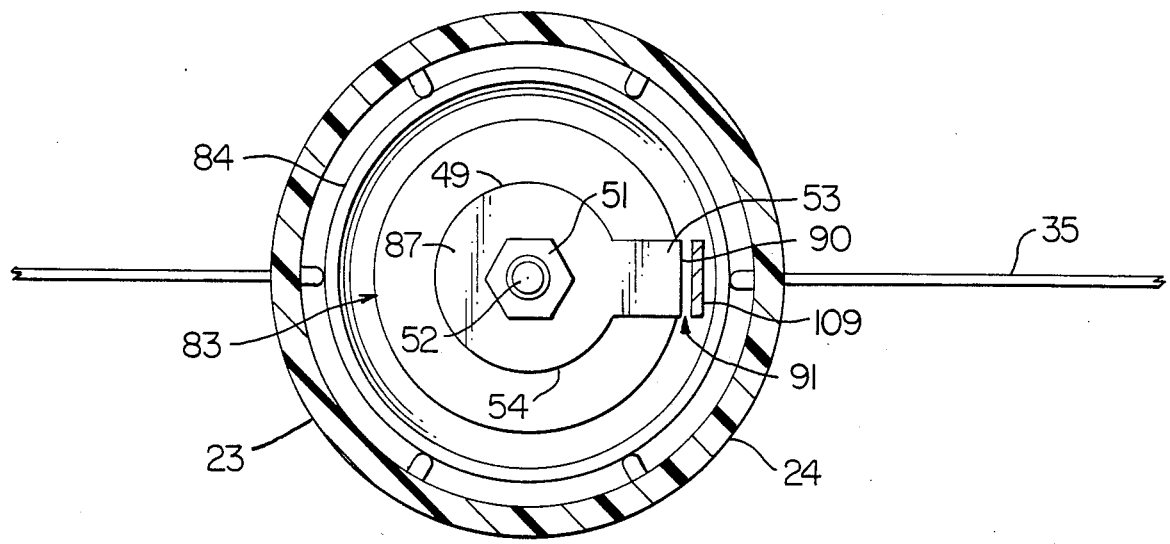
FIG. 3 is a fragmentary cross-sectional view taken on line 3—3 of FIG. 2.

A suitably shaped weather vane 35 of plastic material or the like is rotatably carried by the housing means 23 by being interconnected to an upper end 36 of a shaft 37 rotatably carried by the housing means 23 and having a lower portion or section 38 disposed within the chamber 28 of the housing means 23, a threaded fastening member 39 securing the weather vane 35 to the portion 36 of the shaft 37 that is shaped and disposed in a splined relation within an internally shaped and splined cavity 40 of the weather vane 35 as illustrated in FIG. 2 so that the vane 35 causes the shaft 37 to rotate in unison therewith. The shaft 37 is rotatably mounted to the housing means 23 by a pair of suitable bearing means 41 and 42, the upper bearing means 41 being disposed in a stepped opening 43 formed through the closed end 29 of the cup-shaped housing member 24 while the lower bearing means 42 is disposed in a stepped bore 44 of a cylindrical member 45 formed of iron material for a purpose hereinafter described. A metallic tubular member 46 telescopically receives the shaft 37 therethrough and has one end 47 disposed against the bearing means 41 and the other end 48 thereof disposed against the bearing means 42.

A substantially circular disc-like member 49, also formed of iron material, has an opening 50 passing centrally therethrough so as to be telescoped onto the lower portion 38 of the shaft 37 and be secured thereto against the lower bearing means 42 by a nut 51 threaded onto a threaded end portion 52 of the lower section 38 of the shaft 37 as illustrated in FIG. 2 so as to rotate in unison with the shaft 37. If desired, the opening 50 of the member 49 could be internally threaded so as to be threaded onto the threaded end 52 of the shaft 37.

The member 49 has an outwardly directed tang 53 which is substantially rectangular in configuration and extends beyond the circular periphery 54 of the member 49 for a purpose hereinafter described, the member 49 being secured to the shaft 37 in such a manner that the tang 53 corresponds to the longitudinal axis of the weather vane 35 so that the tang 53 is directed in the same direction that the weather vane 35 is being directed by the wind acting on the weather vane 35 for a purpose hereinafter described.

An anemometer is rotatably carried by the housing means 23 and is generally indicated by the reference numeral 55, the anemometer 55 comprising a hub 56 that is splined to a splined end 57 of a shaft 58 that is rotatably carried by the housing means 23 so that an upper portion or section 59 of the shaft 58 is disposed within the chamber 28 of the housing means 23, the hub 56 being secured to the end 57 of the shaft 58 by a threaded fastening member 60 as illustrated whereby the shaft 58 rotates in unison with the anemometer 55.

A plurality of hemisphre-like members 61 are disposed in radial relation about the hub 56 and are interconnected thereto by portions 62 in a manner well known in the art whereby the hub 56 will be rotated by the wind acting against the hemispherical members 61 in a manner well known in the art and thereby will rotate the shaft 58 for a purpose hereinafter described, the shaft 58 being rotatably mounted to the housing means 23 by a lower bearing means 63 and an upper bearing means 64. The anemometer is formed of plastic material and can be molded into the configuration illustrated in the drawings.

Figure 5:
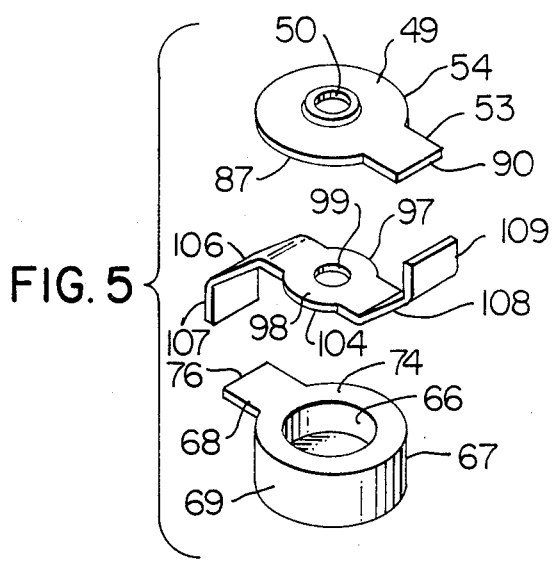
FIG. 5 is a reduced exploded perspective view of three of the parts of the weather vane device of FIGS. 1-4.
Figure 4:
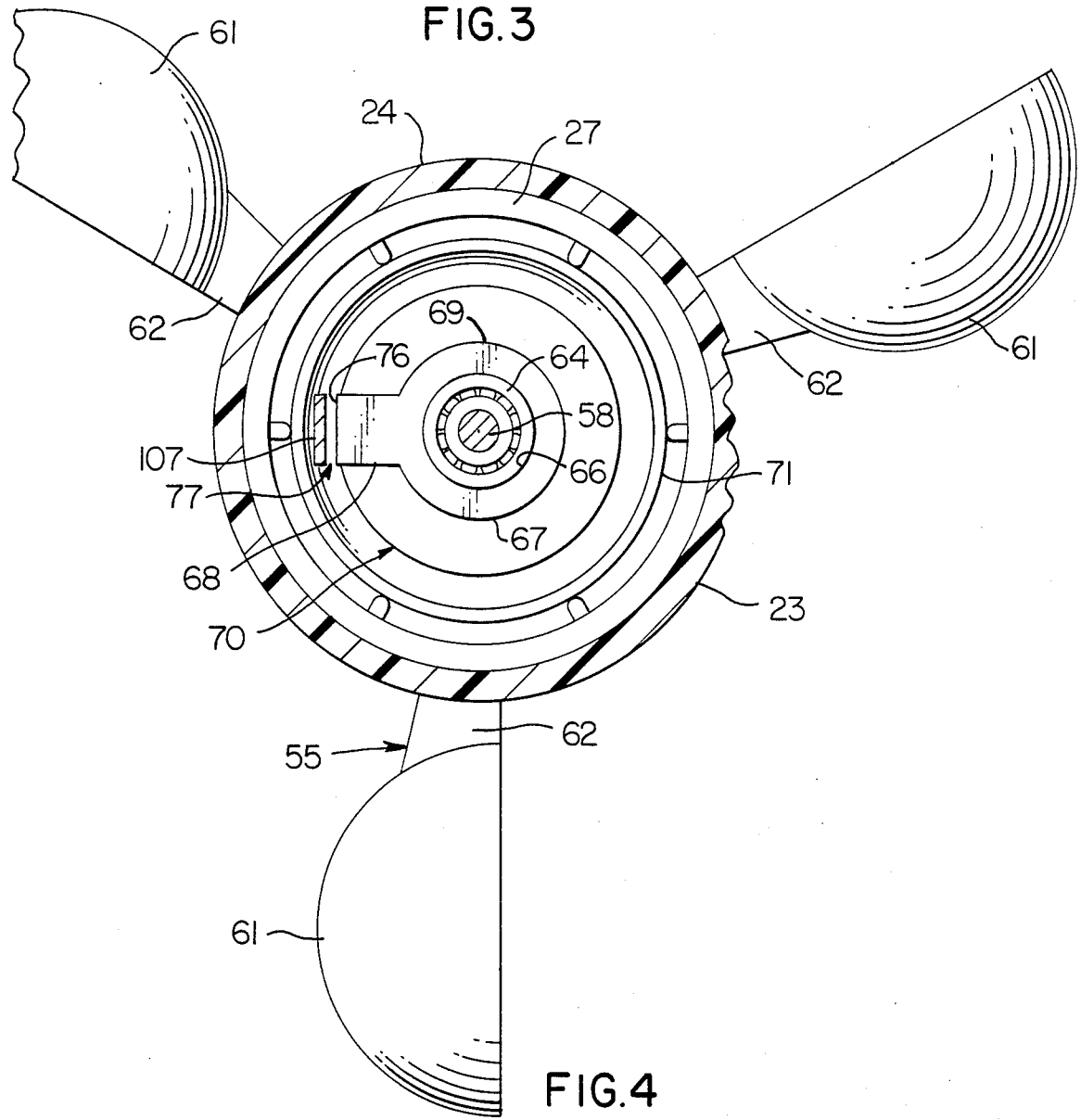
FIG. 4 is a fragmentary cross-sectional view taken on line 4—4 of FIG. 2.

The lower bearing means 63 is disposed in a stepped bore 65 passing through the closed end 30 of the cup-shaped housing member 25 and the upper bearing means 64 is disposed in a stepped bore 66 of a cylindrical member 67 that is formed of iron material in the same manner as the cylindrical member 45 previously described except that the member 67 has an outwardly directed substantially rectangular integral tang 68 extending outwardly from the substantially cylindrical peripheral surface 69 of the member 67 as illustrated in FIGS. 2, 4 and 5 for a purpose hereinafter described. A tubular member 46' is telescoped on the shaft 58 and has the opposed ends 47' and 48' thereof abutting the bearing means 63 and 64 in the same manner as the tubular member 46 for the shaft 37.

A first electrical coil means that is generally indicated by the reference numeral 70 is disposed in the chamber 28 of the housing means 23 and comprises a cup-shaped member 71 formed of iron material and having its closed end 72 secured against the shoulder 34 of the housing member 25 with its open end 73 being disposed substantially co-planar with the upper surface 74 of the cylindrical member 67, the internal peripheral surface 75 of the cup-shaped member 71 not only being disposed concentric and spaced from the peripheral surface 69 of the member 67, but also being spaced from the outer edge 76 of the tang 68 of the member 67 to define an air gap means therewith that is generally indicated by the reference numeral 77 for a purpose hereinafter described.

The coil means 70 includes an annular bobbin 78 formed of plastic material and having a coil 79 of wire wound thereon in a manner well known in the art, the bobbin 78 being disposed against an inside bottom wall 80 of the cup-shaped member 71 and engaging against a lower surface 81 of the cylindrical member 67 as illustrated.

The coil means 70 also comprises a permanent magnet 82 formed in annular form and having the poles thereof coaxially disposed, the magnet 82 being disposed within the bobbin 78 and between the end wall 80 of the cup-shaped member 71 and the surface 81 of the cylindrical member 67 whereby the upper portion 59 of the shaft 58 passes coaxially through the electrical coil 78 and the permanent magnet 82 so as to rotate relative thereto and to operatively associate the anemometer 55 to the coil means 70 in a manner hereinafter described.

A second electrical coil means that is generally indicated by the reference numeral 83 is disposed in the chamber 28 of the housing means 23 to be operatively associated with the weather vane 35 in a manner hereinafter described, the second electrical coil means 83 being substantially identical to the coil means 70 previously described and comprising a cup-shaped member 84 formed of iron material and having its closed end 85 secured against the annular shoulder 33 of the cup-shaped housing member 24 with its open end 86 being disposed substantially co-planar with a lower surface 87 of the member 49 that is carried by the shaft 37 for a purpose hereinafter described. The internal peripheral surface 88 of the cup-shaped member 84 is disposed concentric to and spaced from the outer peripheral surface 89 of the cylindrical member 45 as well as from the peripheral surface 54 of the movable member 49. In addition, the internal peripheral surface 88 of the cup-shaped member 84 is spaced from an outer edge 90 of the tang 53 of the member 49 so as to define an air gap means 91 therewith for a purpose hereinafter described.

The second electrical coil means 83 includes an annular bobbin 92 having a coil 93 of wire wound thereon and a permanent magnet 94 disposed within the same between an inside wall 95 of the cup-shaped member 84 and an upper surface 96 of the cylindrical member 45 so that the coil means 83 is substantially the same as the coil means 70 previously described, the lower portion 38 of the shaft 37 being rotatable within the coil means 83. The coil means 83 and 70 are coaxially arranged in spaced apart relation in the housing means 23 and the shafts 37 and 58 likewise are coaxially aligned in spaced apart relation therein.

An actuator member 97 is secured to the shaft 58 to rotate in unison therewith, the actuator member 97 having a central disc-like portion 98 provided with an opening 99 passing therethrough and receiving a threaded end 100 of the shaft 58 therethrough. A tubular member 101 is disposed on the shaft 58 and has its lower end 102 abutting the bearing means 64 and its upper end 103 engaging against the under surface 104 of the member 97 so that the member 97 can be compressed against the end 103 of the tubular member 101 by a nut 105 being threaded on a threaded end 100 of the shaft 58 so that the member 97 will rotate in unison with the shaft 58. Of course, the opening 99 of the member 97 could be internally threaded so as to be threaded on the threaded end 100 of the shaft 58, if desired, the important feature being that the actuator member 97 rotate in unison with the shaft 58.

The actuator member 97 has a first actuator arm or means 106 extending from the disc-like portion 98 thereof and is arranged so as to have the end 107 thereof adapted to pass through the air gap 77 of the coil means 70 for a purpose hereinafter described. Similarly, the actuator member 97 has a second actuator arm or means 108 extending therefrom and provided with an end 109 adapted to be disposed in the air gap 91 of the second coil means 83 for a purpose hereinafter described.

The cup-shaped housing member 24 has an integral tubular part 110 extending from the side thereof and provided with an opening 111 adapted to receive an end 112 of a hollow supporting tubular member 113 therein so as to support the device 21 to a mast of a boat or the like in a manner well known in the art, the weather vane device 21 being supported in such a manner that the tang 74 of the coil means 70 is coaxially aligned with a reference part of the boat, such as the bow thereof, so as to provide a reading on the instrument 22 of the angle that the wind is making relative thereto as will be apparent hereinafter.

The hollow tubular support member 113 not only positions the device 21 and supports the same thereto, but also the opening 114 passing through the support 112 permits suitable electrical leads (not shown) from the electrical coils 79 and 93 to be interconnected into the electrical circuit that is generally indicated by the reference numeral 115 in FIG. 7 in a manner hereinafter set forth.

From the above, it can be seen that the weather vane device 21 of this invention can be formed of relatively few parts in a relatively simple manner and, if desired, the weather vane 35 and the second coil means 83 can be secured to the housing part 24 in their assembled relation solely by the fastening means 39 and 51 and the anemometer 55 and first coil means 70 can be likewise fastened in their assembled relation to the lower cup-shaped member 25 solely by the fastening means 60 and 105, the cup-shaped members 24 and 25 thereafter being secured together so that the resulting weather vane device 21 of this invention is adapted to operate in a manner now to be described.

With the weather vane device 21 of this invention mounted to a boat or the like by the supporting shaft 113 in such a manner that the tang 74 of the first coil means 70 is coaxially aligned with a reference part of that boat, such as the longitudinal axis of the boat that passes through the bow thereof, the indicator 22 will indicate the angle of the wind relative to the bow because the weather vane device 21 of this invention provides an electrical signal means through the leads 116 and 117 in FIG. 7 to the indicating means 22 in a unique manner so that the indicating means 22 will indicate the wind direction relative to the bow of the boat. The signal means is produced by the weather vane 35 and the anemometer 55 that are respectively acted upon by the wind encountered by the boat carrying the device 21.

In particular, the anemometer 55 has a first means 70 and 107 for providing a first electrical current signal for every revolution thereof relative to the bow of the boat and has a second means 83 and 109 for providing a second electrical current signal for every revolution thereof relative to the actual position of the weather vane 35 as provided by the movable tang 53 whereby such first and second electrical current signals are utilized by the electrical circuit 115 to cause the indicating means 22 to indicate the wind angle relative to the bow of the boat by multiplying 360° by the quotient of the time that elapses between the occurrence of a first electrical current signal and the next second electrical current signal divided by the time that elapses between the occurrence of two successive first electrical current signals whereby the first electrical current signals and the second electrical current signals from the device 21 comprise the electrical signal means thereof.

For example, as the anemometer 55 is rotating the shaft 58, the actuator or end 107 of the arm 106 moves into, through and out of the air gap 77 for every revolution of the shaft 58 and an electrical pulse is created in the electrical coil 79 each time the actuator 107 is disposed in the air gap 77 as the actuator 107 tends to fill the air gap 77 and thereby concentrate the flux from the permanent magnet 82 in such a manner that a positive part of the pulse is created in the coil 70 as the actuator end 107 is moving into the gap 77 and a negative part of the pulse is created in the coil 79 as the actuator end 107 moves out of the air gap 77. Such pulse is generally indicated by the reference numeral 119 in FIG. 6.

Thus, it can be seen that as the shaft 58 is rotated by the anemometer 55, the coil means 70 will produce a pulse 119 for every revolution of the actuator 107 relative to the tang 74 and, thus, relative to the particular part of the boat which has been selected as where the longitudinal axis of the boat passes through the bow thereof.

Figure 6:
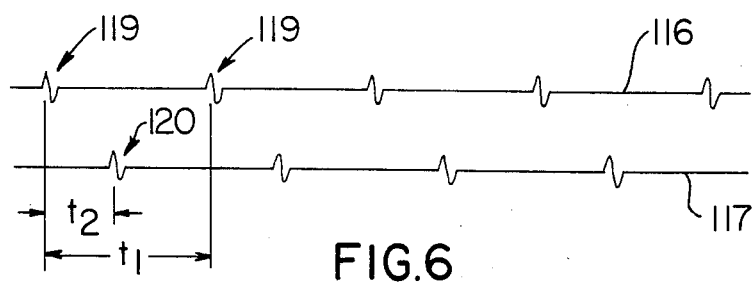
FIG. 6 is a schematic view illustrating the electrical signal means produced by the weather vane device of FIGS. 1-4.

The time that elapses between two successive first electrical current signals or pulses 119 in FIG. 6 is represented by the reference letter $t_1$.

The actuator end 109 of the anemometer 55 causes the second coil means 83 to likewise create an electrical pulse each time the end 109 passes through the air gap 91 in the same manner as the air gap 77 previously described except that the air gap 91 is a movable air gap and is related to the actual position of the weather vane 35 relative to the bow of the boat as the member 49 rotates in unison with the shaft 38 which is positioned by the weather vane 35. Such electrical pulse from the second coil means 83 is generally indicated by the reference numeral 120 in FIG. 6 and the time that elapses between the occurrence of a first electrical current signal 119 and the next second electrical current signal 120 is indicated by the reference letter $t_2$.

Thus, it can be seen that the second coil means 83 will create a pulse 120 each time the actuator end 109 is moved through the air gap 91, the coil means 70 and 83 producing such electrical signals or pulses 119 and 120 without requiring any electrical power to be supplied to the weather vane device 21 as the device 21 is self-powering through the action of the wind rotating the anemometer 55.

Thus, the wind angle can be determined from the electrical pulses or signals 119 and 120 by determining the length of time that elapses between the occurrence of a first electrical signal 119 and the next second electrical current signal 120 which is $t_2$ in FIG. 6 and dividing the same by the time $t_1$ that elapses between the occurrence of two successive first electrical signals 119 and multiplying that quotient times 360° and this is accomplished by the electrical circuit means 115 of the weather vane system 20 of this invention in a manner hereinafter described.

Also, if desired, wind speed can be indicated on the indicating means 22 by the electrical circuit 115 utilizing the frequency of either the pulses 119 or the pulses 120 as that frequency can readily be translated into wind speed in a manner well known in the art and is provided on the indicator 118 of FIG. 7 in a manner hereinafter described.

Nevertheless, it can be seen that the weather vane device 21 of this invention utilizes both the weather vane 35 and the anemometer 55 for indicating the wind direction in a unique manner.

While the weather vane device 21 has been previously described as utilizing permanent magnets 82 and 94 so that electrical power need not be supplied to the device 21 which is a particularly useful arrangement for sail boats where power consumption is of primary concern, the permanent magnets 82 and 94 could be eliminated and electrical current could be supplied to the coils 79 and 93 and the actuator means 107 and 109 would respectively provide ripples on the driving current thereof each time the respective actuator means 107 and 109 move through their respective air gaps 77 and 91 so that the ripples could be utilized in the same manner as the pulses 119 and 120 for providing the wind direction relative to the particular part of the boat.

In any event, it can be seen that the weather vane device 21 has a first electrical coil means 70 disposed in the housing means 23 and a first actuator means 107 carried by the shaft 58 of the anemometer 55 to produce the first electrical current signal 119 for every revolution of the actuator means 107 relative to the bow of the boat as represented by the tang 74 and a second electrical coil means 83 disposed in the housing means 23 and a second actuator means 109 carried by the anemometer shaft 58 to cause the second coil means 83 to produce a second electrical current signal 120 for every revolution of the second actuator means 109 relative to the actual position of the weather vane 35 as the tang 53 is in the same position as the weather vane 35 by means of the shaft 37.

While any suitable means can be utilized to convert the pulses 119 and 120 into a visual indication of the wind angle relative to the bow of the boat using the previously described formula, it is believed that the circuit means 115 illustrated in FIG. 7 can be utilized for this purpose.

As illustrated in FIG. 7, the pulse signals 119 and 120 from the masthead transmitter or weather vane device 21 are detected at leads 116 and 117 and are amplified by conventional amplifiers 121 and 122 which respectively feed the amplified electrical signals to the clock inputs C of conventional flip flop devices 123 and 124. Each time the clock inputs C of the flip flop devices 123 and 124 are pulsed, the outputs Q and $\overline{Q}$ thereof reverse. Thus, when an output Q is on, the output $\overline{Q}$ thereof is off. The outputs Q and $\overline{Q}$ are going on and off at one-half the frequency of the pulses 119 and 120 and the duty signal or percentage on time is exactly 50%.

Either output Q or $\overline{Q}$ from either flip flop device 123 or 124 may be fed to a conventional frequency to voltage convertor 125 wherein the frequency is converted to a proportional voltage output. Thus, if the anemometer balls 61 are designed to rotate at 50 revolutions per second with a 50 mph wind speed and the rotational speed of the aneometer 55 is linear with wind speed and the frequency to voltage convertor 125 is programmed to produce 5 volts out at 25 Hz and the frequency to voltage convertor 125 output is linear with input frequency, then the output from the convertor 125 varies linearly from 0 to 5 volts as the wind varies from 0 to 50 miles per hour. This is the normal method for indicating wind speed which may then be read out on the 0 to 5 volt voltmeter 118 of FIG. 7, the scale of the meter 118 being marked 0 to 50 miles per hour as illustrated.

Since the circuit 115 has a voltage proportional to wind speed at the output of the converter 125, the circuit 115 can calculate wind direction from the time relationship of the pulses 119 and 120 because the pulses 119 and 120, through the design and adjustment in the weather vane device 21, occur at the same instant when the weather vane 35 is pointing to the bow of the boat. Accordingly, as the weather vane 35 rotates clockwise, when viewing the boat from above, the pulses 119 begin to lag behind the pulses 120. When the weather vane 35 is pointing directly aft, the pulses 119 occur half-way between the pulses 120. Therefore, the wind angle relative to the bow is equal to the quotient of $t_2$ divided by $t_1$ multiplied by 360° where $t_1$ is the time between two pulses 119 and $t_2$ is the time from a pulse 119 to a pulse 120 as previously set forth.

The circuit 115 includes a NOR device 126, a Nor device 127, electrically operated switches 128, 129 and 130, a capacitor 131, a ramp generator 132, a capacitor 133, an amplifier 134 and a resistor 135 all being of conventional form and being electrically interconnected together as illustrated in FIG. 7.

In particular, the output of the convertor 125 is adapted to be interconnected to the positive input of the generator 132 when the switch 128 is activated by the NOR device 127, the output of the generator 132 being adapted to be interconnected to the negative input of the generator when the switch 130 is activated by the NOR device 126. The output of the generator 132 is also adapted to be interconnected to the instrument 22 through the amplifier 134 when the switch 129 is activated by the output Q of the flip flop device 123.

In this manner, the ramp generator 132 takes an input voltage signal and develops a linear voltage ramp with time and the generator 132 is calibrated for the 50 mph condition by having 1% of the 5 volt output from the frequency to voltage convertor 125 supplied to the input of the generator 132 and the relationship of the resistor 135 and the capacitor 131 is adjusted to produce a voltage ramp that arrives at 5 volts in the period $t_1$. Thus, a 5 volt ramp in $t_1$ seconds at all wind speeds is provided. For example, if the wind speed goes to 25 mph, the frequency to voltage convertor 125 will produce 2.5 volts whereby when 1% of this is supplied to the generator 132, the ramp slope will be half of what it was (it was 250 volts per second and it is now 125 volts per second) but $t_1$ will be twice as long and 5 volts is produced in the period of $t_1$.

Thus, it can be seen that the electrical circuit 115 of the system 20 of this invention can be made in a relatively simple manner from conventional parts to operate in a manner now to be described.

The flip flop devices 123 and 124, the gates of the NOR devices 126 and 127 and the bilateral switches 128, 129 and 130 are arranged so that the operation of the system 20 starts with a pulse 120 and a discharged capacitor 131. When a pulse 120 occurs, the ramp generator 132 is energized through switch 128 as the output of the NOR device 127 goes on and closes switch 128 since its inputs from the output Q of the flip flop device 123 and the output $\overline{Q}$ of flip flop device 124 are off. Switch 129 is open at this time since its signal from the output Q of flip flop device 123 is off. Switch 130 is also open at this time since its signal from the NOR device 126 is off (the input from the output Q of the flip flop device 123 to the NOR device 126 is off but the input from the output Q of the flip flop device 124 is on) whereby the Eramp rises linearly at a rate which would place it at 5 volts in the time period $t_1$, but when the pulse 119 occurs, the output Q of the flip flop device 123 goes on and the NOR device 124 goes off thus opening switch 128 which stops the Eramp of generator 132 from increasing further at time $t_2$. The capacitor 131 is now holding the voltage which is equal to the quotient of $t_2$ divided by $t_1$ times 5 volts. Simultaneously with the opening of switch 128, the output Q of the flip flop device 123 closes the switch 129 which transfers this voltage to the capacitor 133 where it is stored as $E\theta$ and provides a voltage into the wind direction indicator 22. The instrument 22 is a voltmeter calibrated to read 0° to 360° for the range of 0–5 volts received thereby. The buffer amplifier 134 is shown in the input of the voltmeter 22 which may or may not be required depending upon the voltmeter impedance and size of the capacitor 133.

The following pulse 120 turns the output Q of the flip flop device 124 off but does not produce any further action. The following pulse 119 turns the output Q of the flip flop device 123 off which opens the switch 129 leaving the stored voltage $E\theta$ on the capacitor 133 and since the outputs Q of both the flip flop devices 123 and 124 to the NOR device 126 are both off, the output of the NOR device 126 turns on and thus closes the switch 130 which discharges capacitor 131 and resets the Eramp of the generator 132 to 0. The circuit 115 is now set to recycle on the next pulse 120.

Accordingly, the capacitor 133 is updated on every other pulse 120 and indicates wind direction continuously on the instrument 22.

Thus, it can be seen that the instrument 22 of the circuit 115 of the system 20 of this invention provides the visual indication of the wind direction being provided by the weather vane device 21 of this invention, the indicator 118 also providing the visual indication of the wind speed provided by the weather vane device 21 of this invention.

Accordingly, it can be seen that this invention not only provides an improved weather vane system for a boat or the like, but also this invention provides an improved weather vane device and method of making the same.

While the forms and methods of this invention now preferred have been illustrated and described as required by the Patent Statute, it is to be understood that other forms and method steps can be utilized and still fall within the scope of the appended claims.

What is claimed is:

1. In a weather vane system for a boat or the like having a weather vane device providing an electrical signal means that is utilized by an indicating means of said system for indicating the wind direction relative to a particular part of said boat or the like carrying said device, said device having a rotatable weather vane and having means operatively associated with said weather vane for producing said signal means, said means for producing said signal means comprising an anemometer that is rotatably carried by said device and is adapted to be rotated by the wind that positions said weather vane, said anemometer having a first means for providing a first electrical current signal for every revolution thereof relative to said particular part of said boat and has a second means for providing a second electrical current signal for every revolution thereof relative to the actual position of said weather vane whereby said first and second electrical current signals are utilized by said indicating means to indicate wind angle relative to said particular part of said boat by said indicating means multiplying 360° by the quotient of the time that elapses between the occurrence of a first electrical current signal and the next second electrical current signal divided by the time that elapses between the occurrence of two successive first electrical current signals whereby said first electrical current signals and said second electrical current signals comprise said electrical signal means, said device having a housing means, said anemometer having a rotatable shaft provided with a section thereof disposed in said housing means, said first means comprising a first electrical coil means disposed in said housing means and a first actuator means carried by said section of said shaft to cause said first coil means to produce said first electrical current signal for every revolution of said first actuator means relative to said particular part of said boat, said second means comprising a second electrical coil means disposed in said housing means and a second actuator means carried by said section of said shaft to cause said second coil means to produce said second electrical current signal for every revolution of said second actuator means relative to the actual position of said weather vane, said first coil means having a first air gap means, said first actuator means causing said first coil means to produce said first electrical current signal each time said first actuator means passes through said first air gap means, said second coil means having a second air gap means, said second actuator means causing said second coil means to produce said second electrical current signal each time said second actuator means passes through said second air gap means, the improvement wherein said first coil means has a fixed tang defining one side of said first air gap means, said second coil means having a movable tang defining one side of said second air gap means, said weather vane having a rotatable shaft provided with a section thereof disposed in said housing means, said movable tang being carried by said section of said shaft of said weather vane so as to be positioned in said housing means in relation to the actual position of said weather vane.

2. A weather vane system as set forth in claim 1 wherein said first coil means comprises a first annular coil having said section of said shaft of said anemometer passing coaxially therethrough, said second coil means comprising a second annular coil having said section of said shaft of said weather vane passing coaxially therethrough, said coils being coaxially aligned in spaced apart relation in said housing means, said first coil means comprising a first cylindrical permanent magnet disposed inside said first coil and having said section of said shaft of said anemometer passing coaxially therethrough, said second coil means comprising a second cylindrical permanent magnet disposed inside said second coil and having said section of said shaft of said weather vane passing coaxially therethrough.

3. A weather vane system as set forth in claim 1 wherein said coil means are coaxially aligned in spaced apart relation in said housing menas, and an actuator member carried by said section of said shaft of said anemometer and having opposed arms respectively defining said first actuator means and said second actuator means.

4. A weather vane system as set forth in claim 3 wherein said arms respectively have free ends for respectively passing through said first air gap means and said second air gap means.

5. A weather vane system as set forth in claim 4 wherein said free ends of said arms respectively extend in opposite directions and are disposed substantially parallel to said shaft of said anemometer.

6. A weather vane system as set forth in claim 5 wherein said section of said shaft of said anemometer has a free end, said actuator member being secured to said free end of said section.

7. A weather vane system as set forth in claim 6 wherein said actuator member is a one-piece member.

8. In a weather vane device for providing an electrical signal means that can be utilized for indicating the wind direction relative to a particular part of a boat or the like carrying said device, said device having a rotatable weather vane and having means operatively associated with said weather vane for producing said signal means, said means for producing said signal means comprising an anemometer that is rotatably carried by said device and is adapted to be rotated by the wind that positions said weather vane, said anemometer having a first means for providing a first electrical current signal for every revolution thereof relative to said particular part of said boat and has a second means for providing a second electrical current signal for every revolution thereof relative to the actual position of said weather vane whereby said first and second electrical current signals can be utilized to indicate wind angle relative to said particular part of said boat by multiplying 360° by the quotient of the time that elapses between the occurrence of a first electrical current signal and the next second electrical current signal divided by the time that elapses between the occurrence of two successive first electrical current signals whereby said first electrical current signals and said second electrical current signals comprise said electrical signal means, said device having a housing means, said anemometer having a rotatable shaft provided with a section thereof disposed in said housing means, said first means comprising a first electrical coil means disposed in said housing means and a first actuator means carried by said section of said shaft to cause said first coil means to produce said first electrical current signal for every revolution of said first actuator means relative to said particular part of said boat, said second means comprising a second electrical coil means disposed in said housing means and a second actuator means carried by said section of said shaft to cause said second coil means to produce said second electrical current signal for every revolution of said second actuator means relative to the actual position of said weather vane, said first coil means having a first air gap means, said first actuator means causing said first coil means to produce said first electrical current signal each time said first actuator means passes through said first air gap means, said second coil means having a second air gap means, said second actuator means causing said second coil means to produce said second electrical current signal each time said second actuator means passes through said second air gap means, the improvement wherein said first coil means has a fixed tang defining one side of said first air gap means, said second coil means having a movable tang defining one side of said second air gap means, said weather vane having a rotatable shaft provided with a section thereof disposed in said housing means, said movable tang being carried by said section of said shaft of said weather vane so as to be positioned in said housing means in relation to the actual position of said weather vane.

9. A weather vane device as set forth in claim 8 wherein said first coil means comprises a first annular coil having said section of said shaft of said anemometer passing coaxially therethrough, said second coil means comprising a second annular coil having said section of said shaft of said weather vane passing coaxially therethrough, said coils being coaxially aligned in spaced apart relation in said housing means.

10. A weather vane device as set forth in claim 9 wherein said first coil means comprises a first cylindrical permanent magnet disposed inside said first coil and having said section of said shaft of said anemometer passing coaxially therethrough, said second coil means comprising a second cylindrical permanent magnet disposed inside said second coil and having said section of said shaft of said weather vane passing coaxially therethrough.

11. A weather vane device as set forth in claim 8 wherein said coil means are coaxially aligned in spaced apart relation in said housing means, and an actuator member carried by said section of said shaft of said anemometer and having opposed arms respectively defining said first actuator means and said second actuator means.

12. A weather vane device as set forth in claim 11 wherein said arms respectively have free ends for respectively passing through said first air gap means and said second air gap means.

13. A weather vane device as set forth in claim 12 wherein said free ends of said arms respectively extend in opposite directions and are disposed substantially parallel to said shaft of said anemometer.

14. A weather vane device as set forth in claim 13 wherein said section of said shaft of said anemometer has a free end, said actuator member being secured to said free end of said section.

15. A weather vane device as set forth in claim 14 wherein said actuator member is a one-piece member.

* * * * *